(12) United States Patent
Lonas, Jr. et al.

(10) Patent No.: US 11,856,077 B2
(45) Date of Patent: Dec. 26, 2023

(54) SMART CACHING BASED ON REPUTATION INFORMATION

(71) Applicant: Webroot Inc., Broomfield, CO (US)

(72) Inventors: Hal Case Lonas, Jr., Carlsbad, CA (US); Thomas W. Helvey, San Diego, CA (US)

(73) Assignee: OPEN TEXT INC., Menlo Park, CA (US)

( * ) Notice: Subject to any disclaimer, the term of this patent is extended or adjusted under 35 U.S.C. 154(b) by 693 days.

(21) Appl. No.: 16/915,530

(22) Filed: Jun. 29, 2020

(65) Prior Publication Data

US 2020/0401717 A1  Dec. 24, 2020

Related U.S. Application Data (63) Continuation of application No. 14/266,442, filed on Apr. 30, 2014, now Pat. No. 10,735,550.

(51) Int. Cl.
*H04L 29/08* (2006.01)
*G06F 12/08* (2016.01)
(Continued)

(52) U.S. Cl.
CPC ...... *H04L 67/5682* (2022.05); *G06F 12/0802* (2013.01); *G06F 12/0864* (2013.01);
(Continued)

(58) Field of Classification Search
CPC . H04L 12/08; H04L 12/0802; H04L 12/0864; H04L 12/0875; H04L 12/12; H04L 12/128; H04L 12/9574; H04L 67/50; H04L 67/56; H04L 67/561; H04L 67/568; H04L 67/5682; H04L 67/5683
See application file for complete search history.

(56) References Cited

U.S. PATENT DOCUMENTS

| 6,029,175 A | 2/2000 | Chow |
| 6,167,438 A | 12/2000 | Yates |

(Continued)

FOREIGN PATENT DOCUMENTS

| CN | 101916302 | 11/2012 |
| WO | WO 2001/067250 | 9/2001 |

OTHER PUBLICATIONS

Roi Blanco, et al., "Caching Search Engine Results over Incremental Indices", SIGIR '10, Geneva, Switzerland, Jul. 19-23, 2010, 8 pgs.

(Continued)

*Primary Examiner* — Boris D Grijalva Lobos
(74) *Attorney, Agent, or Firm* — Sprinkle IP Law Group (57) ABSTRACT

Embodiments disclosed herein relate to systems and methods for providing a smart cache. In embodiments, a variable time to live (TTL) may be calculated and associated with data as it is stored in a cache. The variable TTL may be calculated based upon reputation and/or category information related to the source of the data. The reputation and/or category information may include TTL modifiers for adjusting the TTL for data from a particular data source that is stored in the cache. In further embodiments, a feedback method may be employed to update reputation and/or category information for a particular data source.

20 Claims, 9 Drawing Sheets

(51) Int. Cl.
| | |
|---|---|
| *G06F 12/12* | (2016.01) |
| *H04L 67/5682* | (2022.01) |
| *G06F 12/0875* | (2016.01) |
| *G06F 12/0864* | (2016.01) |
| *G06F 12/128* | (2016.01) |
| *G06F 16/957* | (2019.01) |
| *G06F 21/60* | (2013.01) |
| *G06F 21/62* | (2013.01) |
| *H04L 67/5683* | (2022.01) |
| *G06F 12/0802* | (2016.01) |
| *H04L 67/561* | (2022.01) |

(52) U.S. Cl.
CPC ......... *G06F 12/0875* (2013.01); *G06F 12/12* (2013.01); *G06F 12/128* (2013.01); *G06F 16/9574* (2019.01); *G06F 21/604* (2013.01); *G06F 21/6218* (2013.01); *H04L 67/561* (2022.05); *H04L 67/5683* (2022.05); *G06F 2212/6032* (2013.04); *G06F 2221/2141* (2013.01)

(56) References Cited

U.S. PATENT DOCUMENTS

| | | | |
|---|---|---|---|
| 6,317,778 B1 | 11/2001 | Dias | |
| 6,772,203 B1* | 8/2004 | Feiertag | G06F 16/957 709/219 |
| 7,454,571 B1 | 11/2008 | Sucharitakul | |
| 8,261,020 B2 | 9/2012 | Krishnaprasad | |
| 8,316,098 B2 | 11/2012 | Luna | |
| 8,635,305 B1* | 1/2014 | Subramaniam | G06F 16/9574 709/219 |
| 8,954,609 B1 | 2/2015 | Holleman | |
| 10,360,159 B1* | 7/2019 | Black | G06F 12/128 |
| 10,735,550 B2 | 8/2020 | Lonas | |
| 2002/0007402 A1* | 1/2002 | Thomas Huston | G06F 16/9574 709/217 |
| 2004/0073707 A1 | 4/2004 | Dillon | |
| 2004/0111413 A1 | 6/2004 | Birbo | |
| 2004/0128346 A1 | 7/2004 | Melamed | |
| 2006/0212930 A1 | 9/2006 | Shull | |
| 2009/0204753 A1 | 8/2009 | Bridge | |
| 2010/0293338 A1 | 11/2010 | Krishnaprasad | |
| 2010/0332513 A1 | 12/2010 | Azar | |
| 2011/0067101 A1 | 3/2011 | Sheshadri | |
| 2012/0109902 A1 | 5/2012 | Rozensztejn | |
| 2012/0158815 A1 | 6/2012 | Kelly | |
| 2013/0276056 A1* | 10/2013 | Epstein | G06F 21/604 726/1 |
| 2014/0310470 A1 | 10/2014 | Rash | |
| 2015/0026757 A1 | 1/2015 | Reddy | |
| 2015/0096018 A1* | 4/2015 | Mircescu | G06F 21/56 726/23 |
| 2015/0186390 A1 | 7/2015 | Katic | |
| 2015/0215187 A1* | 7/2015 | Tuononen | H04L 63/1458 709/224 |

OTHER PUBLICATIONS

Y. Cao, et al., "Evaluation of Strong Consistency Web Caching Techniques", wwwj.tex 15(15), Jul. 16, 2002, pp. 1-36.

Nincaise Fofack, et al., "Analysis of TTL-based Cache Networks", Project-Team MAESTRO Research Report No. 7883, Mar. 2012, ISSN 0249-6399, 27 pgs.

Wei Hao, et al., "A Weblet Environment to Facilitate Proxy Caching of Web Processing Components", University of Texas Dallas, Doctoral Dissertation, 2007, 6 pgs.

Padmanabhan et al., "The Content and Access Dynamics of a Busy Web Server: Findings and Implications", Microsoft Corporation Technical Report, MSR-TR-2000-13, Microsoft Corporation, Redmond, WA, Feb. 2000, 24 pgs.

Sadagopan, et al., "PATHS: Analysis of PATH Duration Statistics and their Impact on Reactive MANET Routing Protocols", MobiHoc '03, Annapolis, Maryland, Jun. 1-3, 2003, pp. 245-256.

Shi, et al., "Workload Characterization of a Personalized Web Site—And Its Implications for Dynamic Content Caching", New York University Technical Report No. TR2002-829, 2002, 17 pgs.

International Search Report and Written Opinion for International Application No. PCT/US2015/027805, dated Jul. 24, 2015, 12 pgs.

Saidye Alici et al., "Adaptive Time-to-Live Strategies for Query Result Caching in Web Search Engines", ECIR, 2012, LNCS 7224, pp. 401-412.

Office Action for U.S. Appl. No. 14/266,422, dated Mar. 25, 2016, 17 pgs.

Office Action for U.S. Appl. No. 14/266,422, dated Sep. 30, 2016, 20 pgs.

Office Action for U.S. Appl. No. 14/266,422, dated Sep. 20, 2017, 18 pgs.

Office Action for U.S. Appl. No. 14/266,422, dated Jul. 10, 2018, 19 pgs.

Office Action for U.S. Appl. No. 14/266,422, dated Jan. 10, 2019, 20 pgs.

Office Action for U.S. Appl. No. 14/266,422, dated Oct. 25, 2019, 20 pgs.

* cited by examiner

| Reputation | TTL +/- |
|---|---|
| high | +1 |
| med | -1 |
| low | 0 |

302

| Category | TTL +/- |
|---|---|
| sports | +1 |
| medicine | +1 |
| adult | -1 |

SMART CACHING BASED ON REPUTATION INFORMATION

CROSS REFERENCE

This application is a continuation of, and claims the benefit of priority under 35 U.S.C. 120 of the filing date of U.S. patent application Ser. No. 14/266,442, filed Apr. 30, 2014, issued as U.S. Pat. No. 10,735,550, entitled "SMART CACHING BASED ON REPUTATION INFORMATION", the entire contents of all of which is hereby expressly incorporated by reference for all purposes.

Caching is commonly used to provide quicker and more efficient access of data. For example, a processor may include a cache to store data that is likely to be accessed or otherwise used again, thereby removing the need to retrieve the data from memory or storage upon subsequent use. In a network environment, a local device may store data it requested from a remote device in a cache in local memory, thereby removing the need to request the data from the remote device when subsequently accessing the data. However, caches are limited in size and, therefore, must make a determination as to what data should be stored in the cache. Different methods, such as a First in, First Out (FIFO) or Last in, First Out (LIFO) have been employed to manage the data stored in a cache. However, these methods do not properly account for dynamically changing data in a cache. For example, certain websites often change their content many times a day. When the website is updated, data related to the website stored in a cache, for example, of a computing device that previously accessed the website, may become stale. It is with respect to this general environment that embodiments of the present technology have been contemplated.

SUMMARY

Embodiments disclosed herein relate to systems and methods for providing a smart cache. In embodiments, a variable Time to Live (TTL) may be calculated and associated with data as it is stored in a cache. The variable TTL may account for potential changes in the source data during the caching. For example, cached data that is likely to change may have a shorter TTL than cached data that is less likely to change. As such, the variable TTL may be employed to increase the effectiveness, or the overall performance, of a cache by increasing access times while minimizing the likelihood that cached data becomes stale.

In embodiments, the variable TTL may be calculated based upon reputation and/or category information related to the data, or the source of the data, that is stored in the cache. In embodiments, the reputation and/or category information may be based on historical and predicted future patterns of a data source. The reputation and/or category information may include TTL modifiers for adjusting the TTL for data from a particular data source that is stored in the cache. In doing so, the reputation and/or category information may be used to dynamically adjust TTL values for cached data to provide more efficient utilization of the cache and to reduce the chance that any data stored in the cache becomes stale.

In further embodiments, a feedback method may be employed to update reputation and/or category information for a particular data source. In embodiments, cache effectiveness data may be collected from one or more devices that employ a smart cache. The cache effectiveness data may be analyzed against known or historical information about a particular type of data and/or a particular data source to determine whether the reputation and/or category information associated with the type of data and/or data source should be updated to provide more efficient utilization of the cache. Based upon the analysis, reputation and/or category information may be updated or otherwise modified.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The same number represents the same element or same type of element in all drawings.

DETAILED DESCRIPTION

Embodiments of the present disclosure relate to systems and methods for employing a smart cache. In embodiments, data stored in the smart cache is associated with a variable Time to Live (TTL). The TTL associated with cached data may control how long the data will remain in the cache. In other words, upon expiration of its TTL, a particular data item or set of data may be expunged from the cache. As such, if a subsequent request is received for cached data that has an expired TTL, in embodiments, the requested data is retrieved from the original data source rather than the cached copy of the data.

Due to the differences in data and their underlying data sources, a one size fits all approach to calculating a TTL value (also referred to herein as a "TTL") for data in a cache does not result in an efficient and effective utilization of a cache. For example, when cached data is from a data source that is frequently updated, for example, a news website, it is likely that the cached data from the data source may become stale after a short amount of time. As used throughout this disclosure, the concept of stale cache data relates to data stored in a cache that is not the most up-to-date version of the data. As such, in embodiments, stale cache data may be data stored in a cache that no longer represents the original data due to changes in the original data that occurred after a copy of the original data was stored in the cache. Thus, stale cached data may not be an accurate representation of source data. Associating data from frequently updated data sources with a shorter TTL helps to reduce the likelihood that the cached data is stale.

Conversely, if cached data is from a source that is infrequently updated, inefficiencies arise when such cached data is stored in the cache for too short of time. If the related data source is infrequently updated, it is unlikely that the cached representation of the data has changed. Therefore, under such circumstances, subsequent requests for the data that require the data to be retrieved from the original source due to expiration of the TTL for the cached data results in an inefficient use of resources to retrieve the same copy of data. Associating data from infrequently updated sources with a longer TTL helps to reduce inefficient use of a cache.

In embodiments, associating reputation and/or category information with a particular type of data or data source may be used to calculate a variable TTL for a particular type of data or for data from a particular data source. The reputation and/or category information may be associated with a TTL modifier that may be used to change the TTL associated with particular data stored in a cache. For example, the TTL modifier may be used to increase or decrease the TTL for a cached entry. As used throughout, a cached entry may be a discrete portion of data stored in a cache. In embodiments, a cached entry may be associated with a variable TTL value. In embodiments, different cached entries may be associated with different TTL values.

Figure 1:
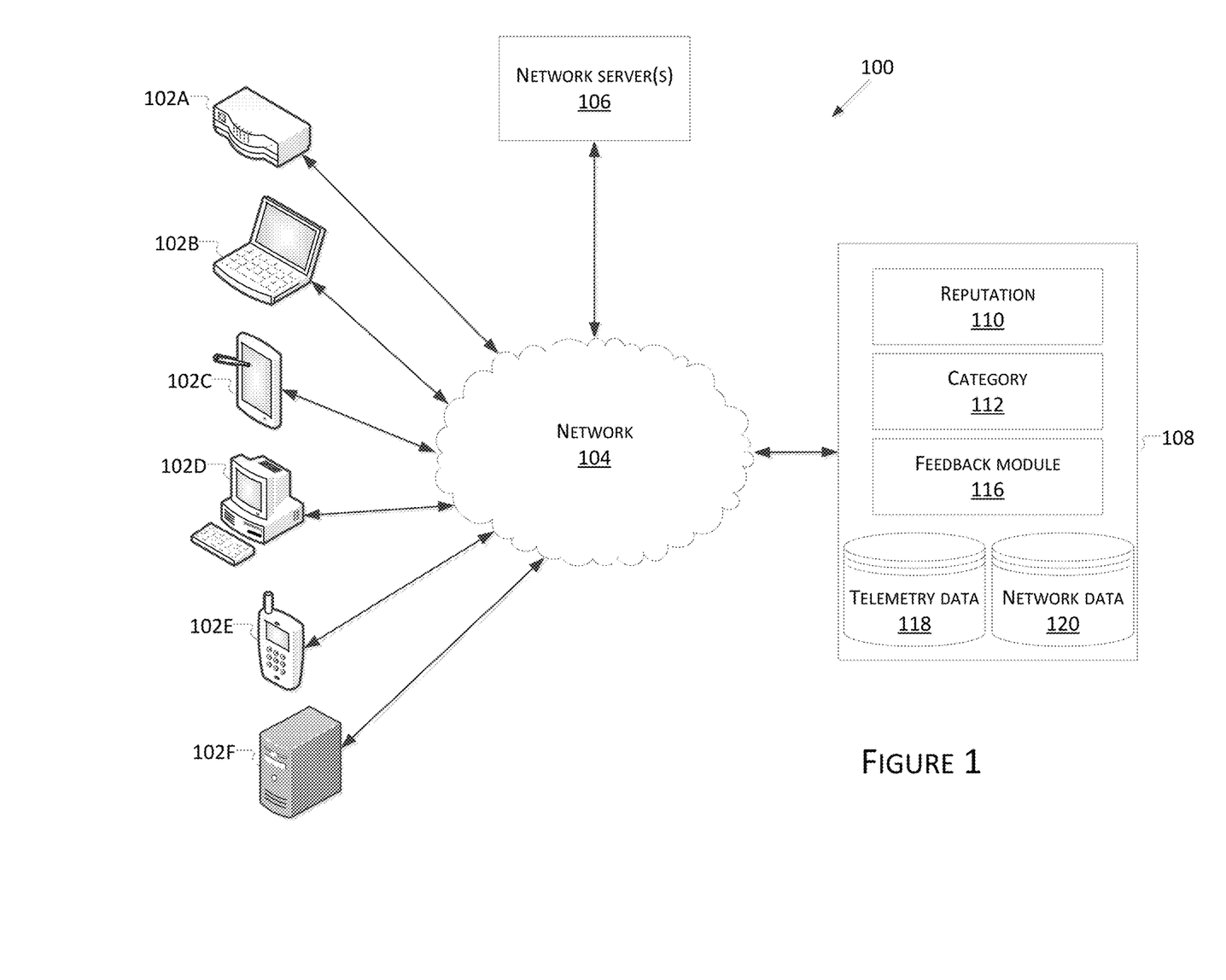
FIG. 1 is an embodiment of a system 100 for employing smart caching of data over a network.

FIG. 1 is an embodiment of a system 100 for employing smart caching of data over a network. One or more client devices, such as client devices 102A-F, may request data from one or more network servers 106. In embodiments, various different types of client devices may be employed with the embodiments disclosed herein. For example, the client device may be a router 102A, a laptop computing device 102B, a tablet computing device 102C, a personal computer 102D, a smart phone 102E, or a server computer 102F. While specific types of client devices are illustrated as part of the system 100, one of skill in the art will appreciate that other types of devices may be employed with the embodiments disclosed herein without departing from the spirit of this disclosure. A client device, e.g., one of client devices 102A-F, may request data from one or more network servers 106. In embodiment, the one or more network servers 106 may be one or more remote computing devices capable of communicating with a client device via a network 104. Exemplary networks include, but are not limited to, a wide area network (WAN), a local area network (LAN), a WiFi network, a cellular network, a plain old telephone service ("POTS") network, the Internet, or any other type of network capable of facilitating the communication of data between multiple devices.

In embodiments, a client device 102A may send a request for data from to a server 106 via network 104. The request may include a uniform resource locator (URL), a uniform resource identifier (URI), an Internet Protocol (IP) address, or any other type of address or identifier that capable of identifying a resource, a data source, or a device on a network. In response to receiving the request, a network server 106 may provide the requested data to the requesting client device 102A via the network 104. While the embodiments illustrated herein are described with respect to client device 102A, one of skill in the art will appreciate that the embodiments disclosed herein may be practiced similarly using other types of client devices, such as client devices 102B-F. In embodiments, a cache may be employed by the client device 102A to store the requested data received from the network server 106. This allows the client device to subsequently access the requested data from the local cache, which allows the client to more efficiently access to the requested data. However, as previously noted, the data stored in the client device's 102A local cache may become stale if the original data located at the data source (e.g., a remote device such as a network server or data store) is modified. For example, a client device 102A may request a news webpage from a network server 106. Upon receiving the requested webpage, the client may store the received news webpage in a local cache. However, when the website is updated to include new content, as is frequently the case for news websites, the cached website becomes stale or out-of-date. Therefore, if a subsequent request for the news webpage is retrieved from the cache, the requested page may be out-of-date.

Associating cached entries with a variable TTL may reduce the likelihood that the cached entry is stale. In embodiments, reputation information or category information may be used to calculate a variable TTL that is customized for a particular type of data or data source. In embodiments, customizing the variable TTL for a particular type of data or data source may include tailoring a TTL for a particular cached entry to balance competing factors of reducing the need to access data over a network with ensuring that the data is up-to-date and accurately represents the original data stored at the data source. In embodiments, reputation information may relate to the trustworthiness of a particular data source, historical performance, whether the data source is known to be a source of malware, spyware, etc. In embodiments, reputation information may represent the security risk associated with visiting a given website or URL. The higher the reputation score, the more trustworthy the website and URL and the lower the risk of visiting. Conversely, the lower the reputation score, the more likely that a visiting user will become infected with malware, experience identity theft, an unwanted trojan install, and/or be subjected to a phishing attempt. As it is impossible to know with certainty whether or not a given URL will compromise a given user at a certain time, the reputation score is an expression of the probability that the visitor will be compromised.

The reputation score of a particular data source, or, in embodiments, a type of data, may be obtained by analyzing characteristics, performance, behavior, etc. of the data source over a period of time. Reputation information may be include and/or be represented as a reputation score. A reputation score may be a classification (e.g., low, medium, or high reputation), a numerical expression (e.g., a value from 1-10, 1-100, 1-1000, etc.) or any other type of classifier. In embodiments, category information may be related to the type of content or type of data provided by a data source (e.g., news, sports, adult, real estate, etc.). In embodiments, category information for a particular data source may be identified by categorizing the type of data or content provided by the data source. In embodiments, content provided data source may be analyzed to determine one or more classifications of the content over a period of time. The classified content may be used to determine a category for a particular data source.

Through analysis of the behavior of various data sources over a period of time, reputation and category information may be associated with a TTL modifier. For example, data sources categorized as news tend to be updated (e.g., experience content changes) more frequently than data sources in other categories. Additionally, analysis of the behavior of various data sources has shown that data sources with medium reputation scores tend to tend to be updated more frequently (e.g., experience content changes) more frequently than data sources having either low or high reputation scores. Based upon historical analysis, the reputation and category information related to a data source (or type of data) may be associated with a TTL modifier. Briefly turning to FIG. 3, an exemplary embodiment of a reputation table 302 and category table 304 is provided. As illustrated in the exemplary embodiment, reputation table 302 provides exemplary TTL modifiers for different reputation classifications (high, medium, and low). In the illustrated embodiment, a TTL of a cached entry from data sources (or data types) with high reputation may be increased, the TTL for cached entries from a data source with a medium reputation may be decreased, while the TTL for a website with a low reputation may be unmodified. One of skill in the art will appreciate that the types of reputation scores and TTL modifiers represented in table 302 are exemplary and other types of reputation scores or TTL modifiers may be employed without departing from the spirit of the disclosure. For example, if a numerical reputation score is provided in lieu of a high/medium/low classification, each value of the reputation score may be associated with a different TTL modifier. In further embodiments, the TTL modifier may take different forms. Further, the TTL modifier may be in the form of positive or negative seconds, minutes, hours, days, etc. One of skill in the art will appreciate that any type of numerical or time value may be used as a TTL modifier without departing from the spirit of this disclosure.

Figure 3:
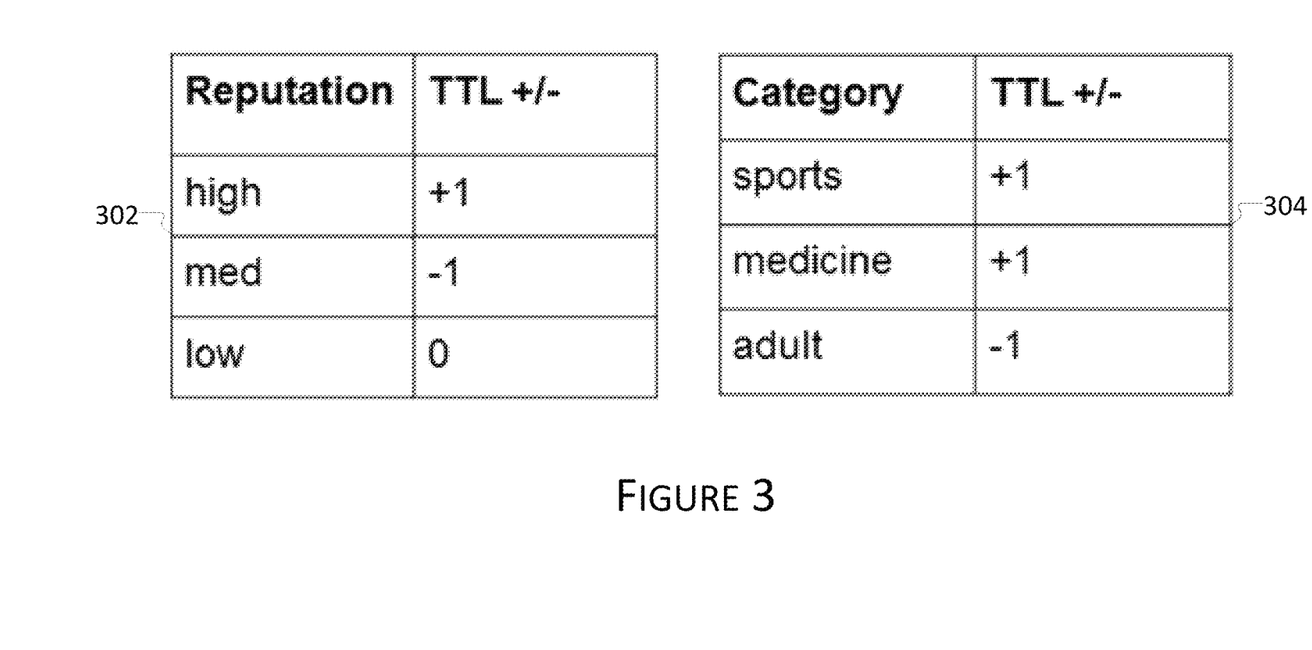
FIG. 3 is an embodiment of exemplary reputation and category information that may be used to calculate a variable Time to Live (TTL).

Table 304 provides exemplary TTL modifiers for different categories of data sources. For example, the TTL for a cached entry from a data source categorized as sports and medicine may be increased while the TTL for a cached entry from a data source categorized as adult may be decreased. As discussed above, the TTL modifier may take different forms. For example, the TTL modifier may be in the form of positive or negative seconds, minutes, hours, days, etc. One of skill in the art will appreciate that any type of numerical, time, or other value may be used as a TTL modifier without departing from the spirit of this disclosure.

Associating a TTL modifier with reputation and category information related to a cached entry from a particular data source or having a particular type allows for the calculation of a variable TTL that is optimized (e.g., results in better utilization of the cache) for the particular cached entry. However, as previously discussed, a significant amount of analysis may be required to accurately assign a reputation or category to a data source. Furthermore, significant analysis may also be required to correctly associate a TTL modifier with a particular reputation score and/or category. Generally, client computing devices do not have the computational resources to perform such analysis. Returning now to FIG. 1, the smart caching system may also include a distributed, or cloud, network 108. In embodiments, the cloud network 108 has the resources required to classify a data source (e.g., a network server 106) by reputation and category and to determine TTL modifiers based upon the classification. In embodiments, the computing network 108 includes a reputation module 110. The reputation module may be used to determine and store reputation classifications for different data sources, such as network server(s) 106. Reputation module 110 may also store reputation information (e.g., data such as table 302 in FIG. 3). In embodiments, reputation module 110 may provide reputation information for a data source in response to receiving a request for reputation information from a client device (such as one of client devices 102A-F) or, in other embodiments, may periodically provide reputation information for a plurality of resources to each client device 102A-F. In such embodiments, the client devices may calculate a variable TTL for each cached entry without requesting assistance, or reputation information, from the cloud network 108 every time data is added to the local cache.

Cloud network 108 may also include a category module 112. The category module may be used to determine and store category information for different data sources, such as network server(s) 106. Category module 112 may also store category information (e.g., data such as table 304 in FIG. 3). In embodiments, category module 112 may provide reputation information for a data source in response to receiving a request for category information from a client device 102A or, in other embodiments, may periodically provide category information for a plurality of resources to each client device 102A-F. In such embodiments, the client devices may calculate a variable TTL for each cached entry without requesting assistance, or category information, from the cloud network 108 every time data is added to the local cache.

In embodiments, cloud network 108 may employ various modules, such as web crawlers, to identify data (e.g., content) from various different data sources on a network (e.g., network server(s) 106). For example, cloud network 108 may employ web crawlers to comb the Internet for data from various different sources (e.g., websites, data stores, etc.). Such information may be stored in network data store 120. The data in network data store 120 may be utilized by reputation module 110 and category module 112 to generate reputation scores and category classifications for various different data sources (or data types).

In one embodiment, client devices 102A-F may receive reputation and category information from the cloud network 108. Briefly turning to FIG. 2, an embodiment of a client device 200 is depicted that may be capable of performing smart caching of content upon receiving reputation and category information from a cloud network. In embodiments, client device 202 may include one or more applications 202. In embodiments, applications 204 may include any type of application that may request data from a remote device over a network. Exemplary applications include, but are not limited to, web browsers and media players. Client device 202 may also include a local reputation module 206. In embodiments, the local reputation module may store, access, and otherwise manage reputation information related TTL modifiers received from a cloud network. Similarly, client 202 may also include a local category module 208 that may store, access, and otherwise manage category information and related TTL modifiers received from a cloud network. In embodiments, local reputation module 205 and local category module 208 may request updates for reputation and category information, respectively, from a cloud network. In further embodiments, local reputation module 205 and local category module 208 may also be employed to modify the local reputation and category information, including any TTL modifiers associated with the information, based upon cache performance.

Figure 2:
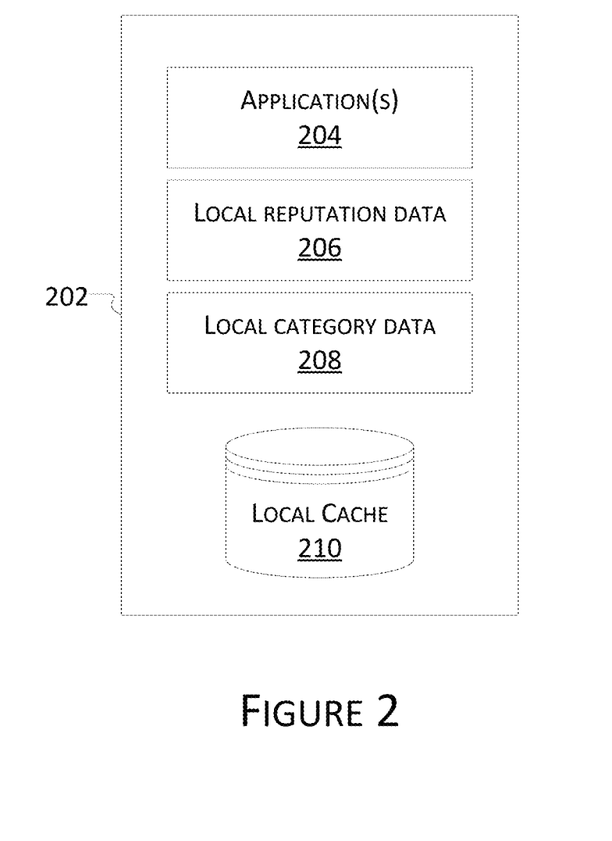
FIG. 2 is an embodiment of a client device 200 that may be capable of performing smart caching of content.

Local device 202 may also include a local cache 210. Local cache 210 may store one or more cached entries related to content previously requested or otherwise accessed by client device 202 or an application(s) 204 that is executing on client device 202. In one embodiment, client device 202 may include a single local cache 210. In further embodiments, client device may include multiple local caches 210. For example, each application executing on client device 202 may be associated with a dedicated local cache 202. In embodiments, local cache 202 is a smart cache that stores cached entries associated with variable TTLs.

Figure 4:
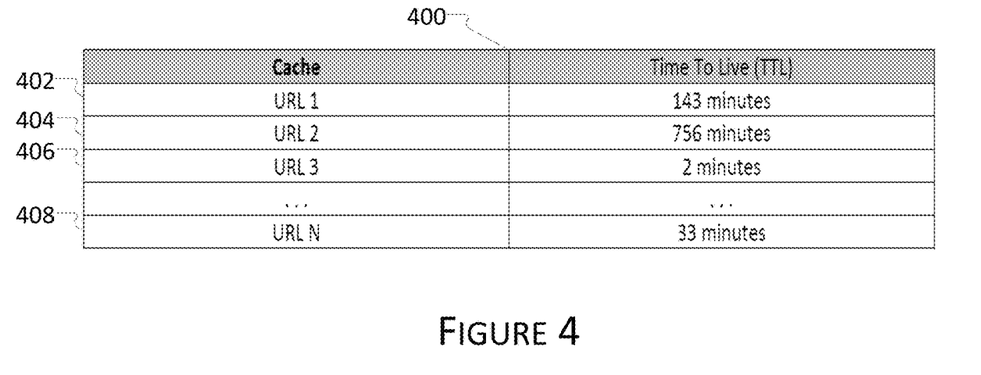
FIG. 4 is an embodiment of an exemplary representation of content stored in a smart cache 400.

Briefly turning to FIG. 4, FIG. 4 is an embodiment of an exemplary representation of content stored in a smart cache 400. In embodiments, a smart cache may include multiple cache entries 402-408, represented by URL 1 through URL N. In embodiments, each entry may be associated variable TTL. For example, cached entry 402 contains data from URL 1 and has a TTL of 143 minutes, cached entry 404 is contains data from URL 1 and has a TTL of 756 minutes, etc. While the exemplary smart cache 400 contains cache entries related to data obtained from different URLs, one of skill in the art will appreciate that the cache entries may be identified by other types of addressing, such as URIs, IP addresses, etc. Additionally, while the exemplary TTL values are provided in minutes, one of skill in the art will appreciate that other units of measurements may be employed without departing from the spirit of this disclosure. Other units may include, but are not limited to, second, hours, days, clock cycles, etc. As previously discussed, each cached entry 402-408 may be associated with a variable TTL based upon reputation and category information related to the data source. As such, smart cache 400 balances the competing objectives of reducing the amount of requests for data that is retrieved from a remote device while minimizing the likelihood that a cached entry is stale.

Returning to FIG. 1, upon receiving the reputation and category information from cloud network 108, a client device, such as client device 102A, may request data from network server(s) 106. Upon receiving the requested data from network server(s) 106, the client device 102A may store the received data as a cached entry in a local cache. In embodiments, the client uses the reputation and category information received from the cloud network 108 to calculate a variable TTL to associate with the cached entry stored in the local cache.

In further embodiments, client devices 102A-F may also send telemetry data to cloud network 108. In embodiments, telemetry data may be data related to cache effectiveness. For example, such data may include the number of cached entries stored in a local cache, the number of data requests that were supplied by the cache, the number of data requests that required retrieving data from an original data source, etc. While specific examples of telemetry data is provided herein, one of skill in the art will appreciate that other types of telemetry data may be sent from the client device 102A to the server 108 without departing from the scope of the present disclosure. Cloud network 108 may store the telemetry data received from one or more client devices 102A-F in a data store, such as telemetry data store 118. In embodiments, cloud network 108 may include a feedback module that analyzes the telemetry data to determine whether TTL modifiers associated with different reputation scores or category classifications should be modified. In embodiments, analyzing the telemetry data may include comparing known network data, for example, data stored in network data store 120 that was retrieved by a network crawler. Such analysis may comprise determining if a cached entry became stale during the TTL period assigned to the cache, determining if data associated with an expired cached entry was accurate at the time the cached entry expired, comparing average update times for a data source against variable TTL values calculated for cached entries of data from the data source, etc. In embodiments, results of the analysis performed by the feedback module 116 may be used update reputation scores and/or the TTL modifiers associated with a particular reputation score, update category classifications and/or the TTL modifiers associated with a particular category classification, and/or otherwise modify reputation and category information.

Figure 5:
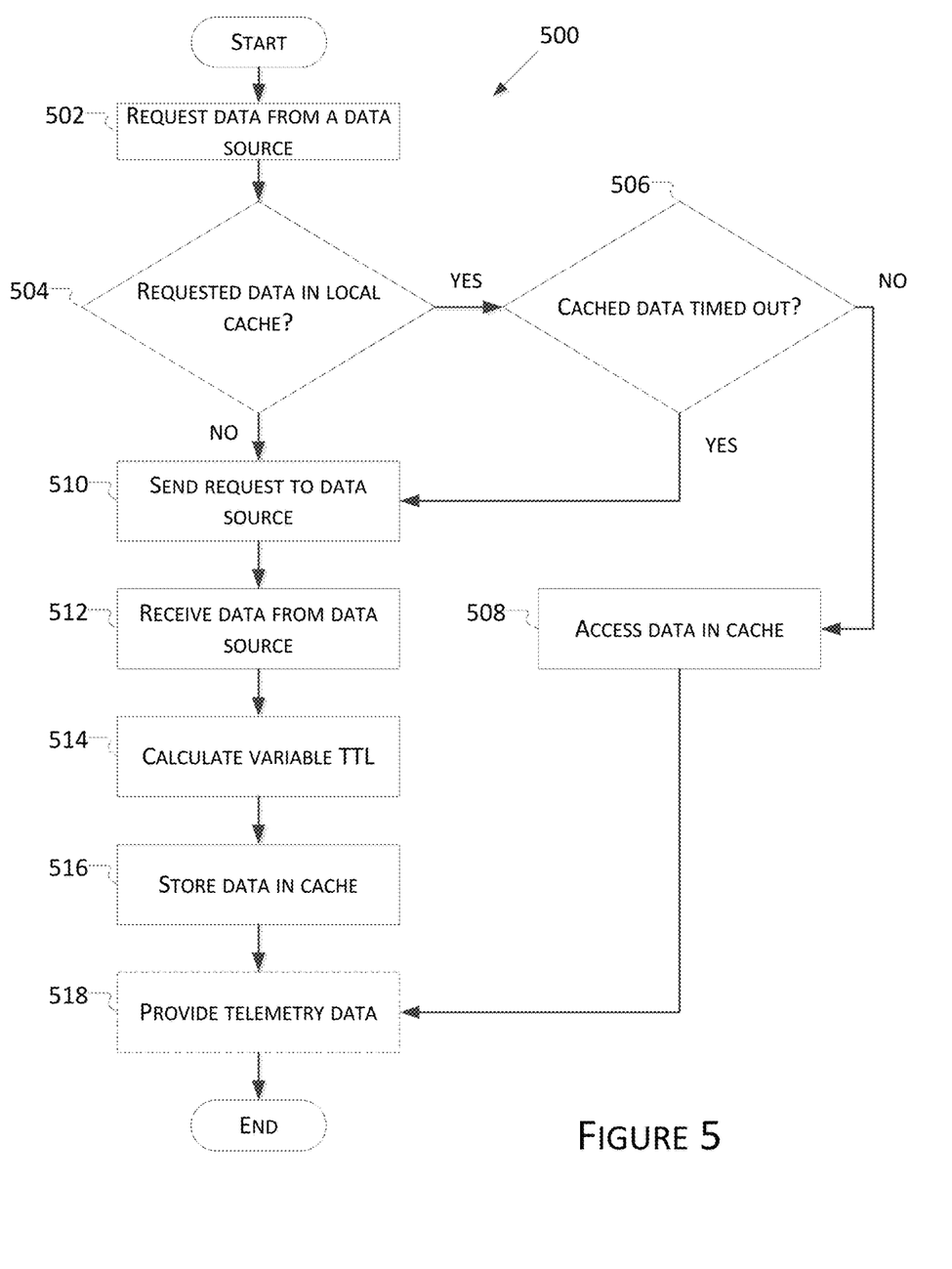
FIG. 5 is an embodiment of a method 500 for accessing data using a smart cache.

Having described various embodiments of systems and devices that may be employed to perform smart caching, the disclosure will now describe exemplary methods for utilizing a smart cache. FIG. 5 is an embodiment of a method 500 for accessing data using a smart cache. The method 500 may be performed by a computing device, such as client computing devices 102A-F from FIG. 1. Flow begins at operation 502 where a request is generated for data from a data source. In one embodiment, the requested data may originate from a remote data source. In other embodiments, the requested data may be stored in a storage device that does not provide quick access to data, such as a hard drive disk. In embodiments, the request may be generated by an application or process executing on the client device. In alternate embodiments, the request may be received from another device.

Upon requesting data from the data source, flow branches to decision operation 501. At decision operation 504, a determination is made as to whether the requested data is resident in a local cache. As previously discussed, a local cache may be a cache stored locally on a client device. In other embodiments, a local cache may be a cache that is part of a specific piece of hardware, such as a cache resident on a processor. If the requested data is in the local cache, e.g., if there is a cached entry for the requested data, flow branches YES to decision operation 506. At decision operation 506, a determination is made as to whether the cached data is timed out. In embodiments, the cached data may be timed out if a TTL associated with the cached entry has expired. If the cached entry has not timed out, flow branches to operation 508 and the requested data is retrieved from the local cache.

Returning to operation 504, if the cached data is not in the local cache, flow branches NO to operation 510. Similarly, if the requested data is in the cache but has expired, flow branches YES from operation 506 to operation 510. At operation 510, a request for the data is sent to the data source. For example, in embodiments where the data source is a remote device, the request for the data may be transmitted to the remote device via a network. If the data source is a hardware component on the device performing the method 500, the request may be sent to the hardware component via a bus. Flow continues to operation 512, where, in response to sending the request for data, the requested data is received from the data store. In embodiment, receiving data from the data source may also include providing the requested data to an application that requested the data.

Flow continues to operation 514. At operation 514, a variable TTL is calculated. In embodiments, the variable TTL may be based upon reputation information and/or category information. For example, the variable TTL may be calculated based upon one or more TTL modifiers associated with the reputation score and category classification of the data source that provided the data. In other embodiments, the variable TTL may be calculated based upon reputation information and/or category information for the type of data, rather than or in addition to the reputation and category information for the data source that provided the information. In further embodiments, information related to the user and or application that requested the data may also be used to calculate the variable TTL. For example, the TTL for a cached entry may be adjusted based upon whether the user is a member of a network or a guest user. Calculation of a variable TTL will be described in further detail with respect to FIG. 6.

Upon calculating the variable TTL, flow continues to operation 516 where the requested data is stored in a cache, such as a local cache. In embodiments, the variable TTL calculated at operation 514 is associated with the cached entry stored at operation 516. Storing the cached entry in a cache will be described in further detail with respect to FIG. 7.

After storing the cached entry representing the requested data in the cache, flow continues to optional operation 518. At optional operation 518, the device performing the method 500 may collect and send telemetry data to a service provider, such as cloud network 108 from FIG. 1. In embodiments, telemetry data may be data related to cache effectiveness. For example, such data may include the number of cached entries stored in a local cache, the number of data requests that were supplied by the cache, the number of data requests that required retrieving data from a remote device, etc. While specific examples of telemetry data are provided herein, one of skill in the art will appreciate that other types of telemetry data may be collected and/or sent at operation 518.

Figure 6:
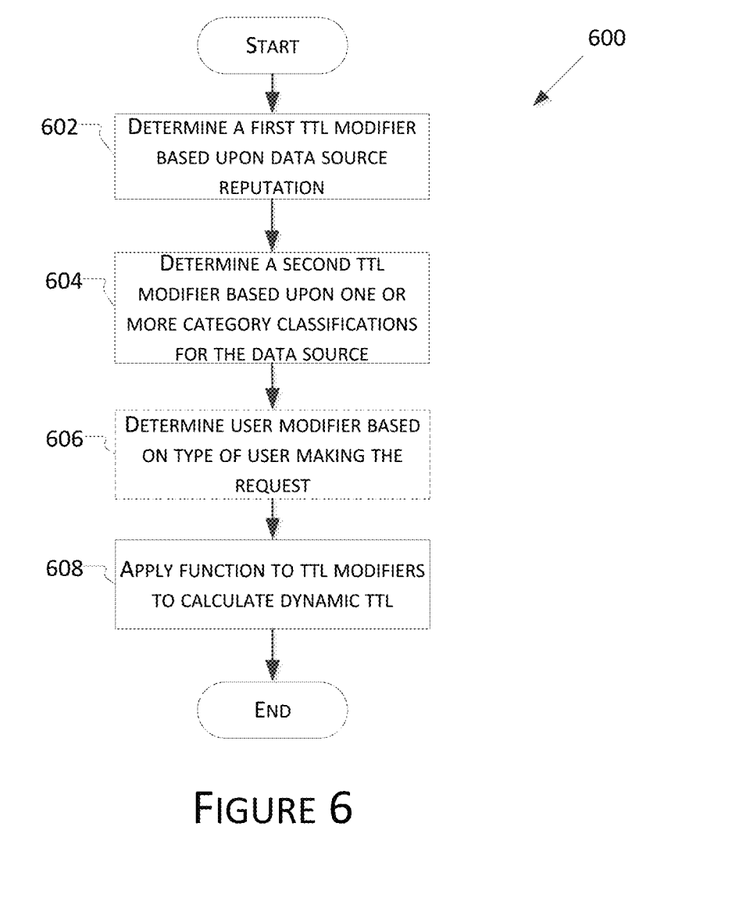
FIG. 6 is an embodiment of a method 600 for calculating a variable TTL.

FIG. 6 is an embodiment of a method 600 for calculating a variable TTL. In embodiments, the method 600 may be performed as part of operation 514 of FIG. 5. Flow begins at operation 602 where a first TTL modifier is determined based upon the reputation information for the data source (and/or data type) that provided the data that is to be stored in the cached entry. In one embodiment, determining the TTL modifier may comprise looking up the TTL modifier associated with a reputation score in a data table, such as, for example, reputation table 302 of FIG. 3. In an alternate embodiment, a first TTL modifier may be dynamically determined at operation 602 based upon the reputation information of the data source that provided the cached entry.

Flow continues to 604 where at least a second TTL modifier is determined based upon the category classification(s) for the data source that provided the data that is to be stored in the cached entry or the data type for the data itself. In one embodiment, determining at least a second TTL modifier may comprise looking up the TTL modifier associated with a one or more category classifications for in a data table, such as, for example, category table 304 of FIG. 3. In embodiments, a data source may be associated with more than one category classification. For example, a website may be classified as news and sports. In such embodiments, multiple TTL modifiers may be determined at operation 604 (e.g., a data modifier for each classification). In alternate embodiments, if the data source (or data type) has multiple category classifications, an algorithm may determine a second TTL modifier. For example, the algorithm may pick the greatest positive TTL modifier or the greatest negative TTL modifier. In further embodiments, algorithms may be employed to create a single modifier generated based upon multiple TTL modifiers for each category. For example, the multiple TTL modifiers may be input into a function to generate a new TTL modifier. In further embodiments, at least one TTL modifier may be dynamically determined at operation 604 based upon the one or more category classifications of the of the data source that provided the cached entry.

Flow continues to optional operation 606 where a TTL modifier may be determined or generated based upon the type of user associated with a data request. For example, a TTL modifier may differ based upon whether the user is a member of a network or organization as opposed to a guest. While specific types of user TTL modifiers are described herein, one of skill in the art will appreciate that TTL modifiers may be based upon other types of information or characteristics related to a user. Similarly, other factors such as the requesting application, time of day, geographical location, and many others may be employed in addition to or alternatively to the embodiments disclosed herein to further adjust the TTL.

Upon determining or generating the various TTL modifiers based upon reputation information, category information, and/or other generalized information, flow continues to operation 608 wherein the TTL modifiers are provided as input to a function to determine a variable TTL. In one embodiment, a variable TTL may calculated by adding and/or subtracting the TTL modifier to, or from, a base TTL value. In embodiments, the base TTL value may be the same for all cache entries. In other embodiments, the base TTL may vary depending upon the type of cached entry, reputation information, category classification, etc. In other further embodiments, the different TTL modifiers may be weighted. For example, a reputation TTL modifier may have a greater effect on the variable TTL than a category TTL modifier. While specific functions have been described herein, one of skill in the art will appreciate that any type of function that receive the TTL modifiers as inputs may be used to calculate a variable TTL without departing from the spirit of the present disclosure.

Figure 7:
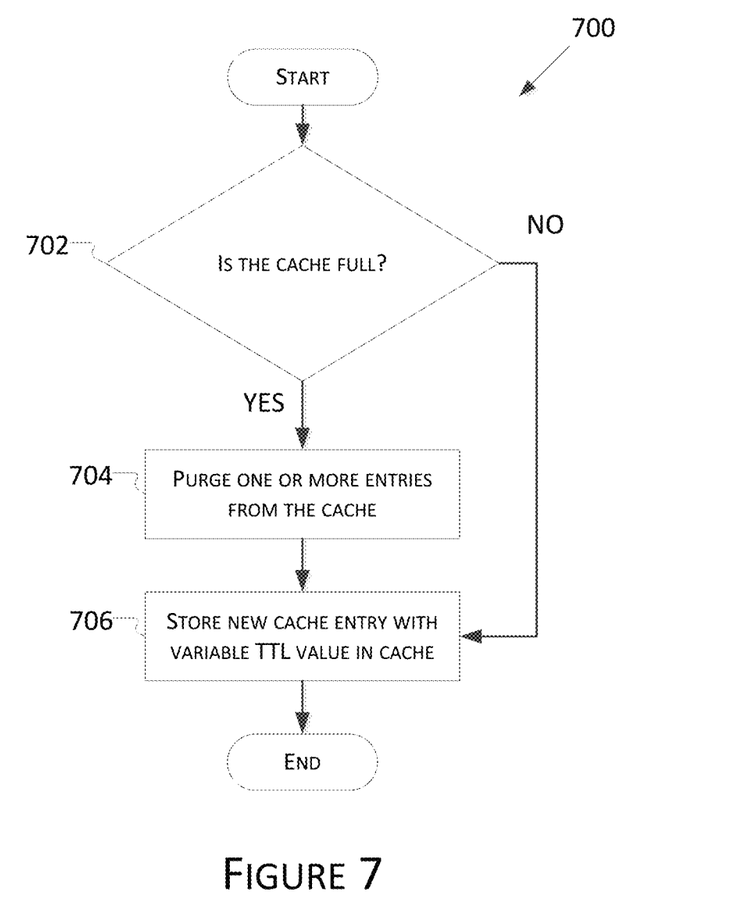
FIG. 7 is an embodiment of a method 700 for storing data in a smart cache.

FIG. 7 is an embodiment of a method 700 for storing data in a smart cache. In embodiments, the method 700 may be performed as part of operation 516 of FIG. 5. Flow begins at decision operation 702 where a determination is made as to whether the cache is full. If the cache is not full, flow branches NO to operation 706 and a new cached entry is stored in the cache. In embodiments, the new cached entry being stored at operation 706 is associated with a variable TTL optimized for the cached entry based upon reputation information, category information, and/or user information. Returning to decision operation 702, if the cache is full, flow branches YES to operation 704 where one or more existing cache entries are purged from a cache. In embodiments, the existing cache entries are purged based upon the variable TTL associated with an existing cached entry. In one embodiment, one or more existing cached entries with expired TTLs may be purged from the cache at operation 704. In an alternate embodiment, for example, when none of the existing cache entries have an expired TTL, an existing cached entry with the shortest TTL may be expunged from the cache at operation 704. Upon purging one or more existing cache entries at operation 704, flow branches to operation 706 where the new cached entry is stored with its associated variable TTL. In alternate embodiments, if the TTL for the new cached entry is less than the TTL for any of the existing cached entries, then the new cached entry may not be added to the cache.

Figure 8:
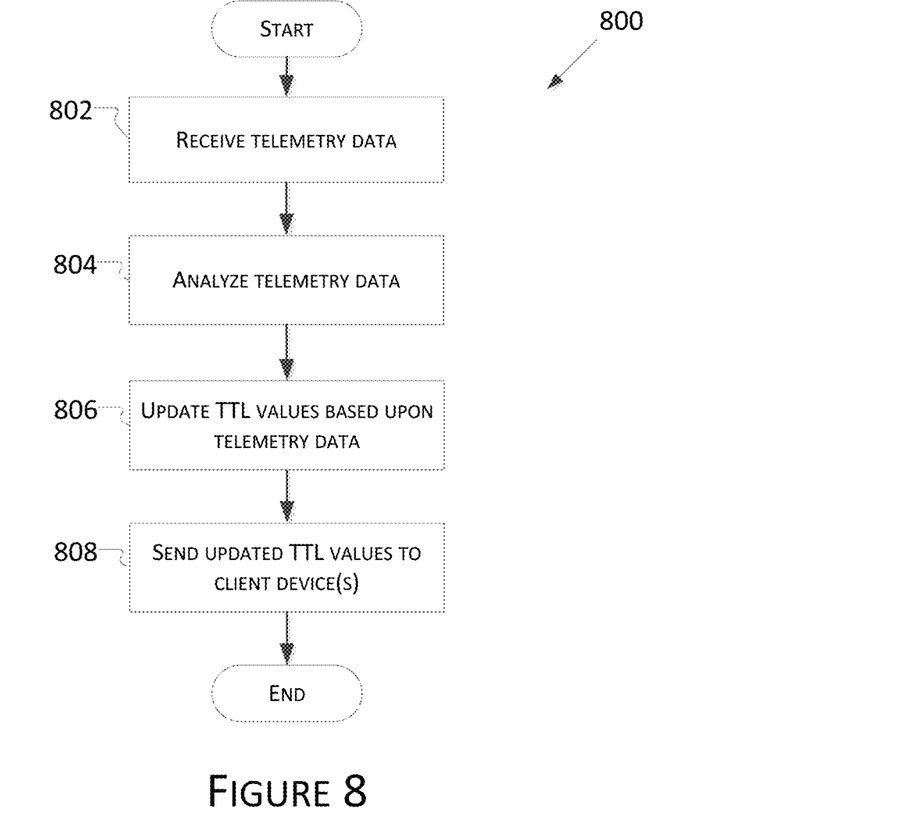
FIG. 8 is an embodiment of a method 800 for adjusting TTL modifiers based upon telemetry data received from one or more devices operating a smart cache.

FIG. 8 is an embodiment of a method 800 for adjusting TTL modifiers based upon telemetry data received from one or more devices operating a smart cache. In one embodiment, the method 800 may be performed by a cloud service on a cloud network, such as, for example cloud network 108 of FIG. 1. In alternate embodiments, the method 800 may be performed by a client device. Flow begins at operation 802 where telemetry data is received. In embodiments, telemetry data may be data related to cache effectiveness. For example, such data may include the number of cached entries stored in a local cache, the number of data requests that were supplied by the cache, the number of data requests that required retrieving data from a remote device, etc. While specific examples of telemetry data are provided herein, one of skill in the art will appreciate that other types of data may be received at operation 802. Flow continues to operation 804 where the telemetry data is analyzed. In one embodiment, analyzing the telemetry data may comprise comparing cached entries to the original data stored at a data source. In other embodiments, analyzing the telemetry data may include comparing known network data, for example, data retrieved by a network crawler. Such analysis may comprise determining if a cached entry became stale during the TTL period assigned to the entry, determining if data associated with an expired cached entry was accurate at the time the cached entry expired, comparing average update times for a data source against variable TTL values calculated for cached entries of data from the data source, etc.

Flow continues to operation 806 were reputation scores, category classification, user classifications, and or TTL modifiers associated with such data are updated based upon the analysis. In embodiments, a reputation table or a category table, such as tables 302 and 304 from FIG. 3, are modified at operation 806. In one embodiment, the updates to the TTL modifiers may be a global update. For example, telemetry data from multiple clients may be analyzed at operation 804 to determine a global update to TTL modification values. In an alternate embodiment, the updated TTL modifications may be customized for a specific client device. In such embodiments, telemetry data for a specific device may be analyzed at operation 804 to determine TTL value modifications for the specific device. Upon updating the TTL modification values, flow continues to operation 808 where the updated TTL values are sent to one or more client devices.

The method 800 provides a feedback loop that may be employed to constantly update TTL modification values, thereby allowing the smart cache to compensate for changes in data source behavior, changes in device behavior, changes to the network, etc. As such, the method 800 provides for dynamic smart caches that may be continually modified to optimize cache effectiveness.

Embodiments disclosed herein may be employed with any type of application and/or device capable of caching data. In one embodiment, the smart cache embodiments disclosed herein may cache URLs as part of a web filtering system. In another embodiment, the smart cache embodiments disclosed herein may be used to cache IP information for an IP threat detection system. The smart cache embodiments may also be employed by mobile applications that regularly change due to updates and new releases. While specific uses of the embodiments of the present disclosure have been provided herein, one of skill in the art will appreciate that the embodiments may be employed to by other types of systems or to accomplish other tasks without departing from the scope of the present disclosure.

Figure 9:
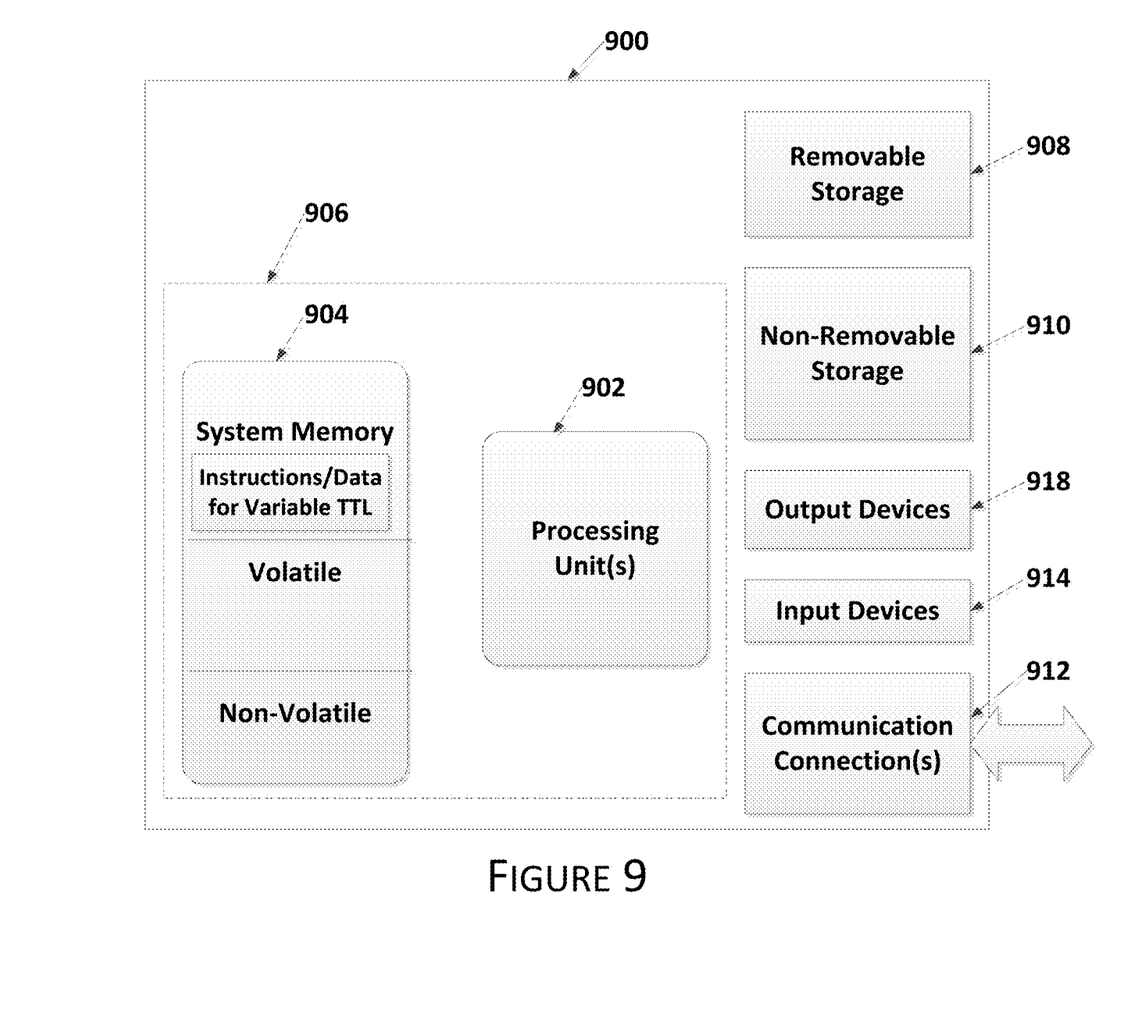
FIG. 9 illustrates one example of a suitable operating environment 900 in which one or more of the present embodiments may be implemented.

FIG. 9 and the additional discussion in the present specification are intended to provide a brief general description of a suitable computing environment in which the present invention and/or portions thereof may be implemented. Although not required, the embodiments described herein may be implemented as computer-executable instructions, such as by program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

FIG. 9 illustrates one example of a suitable operating environment 900 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 900 typically includes at least one processing unit 902 and memory 904. Depending on the exact configuration and type of computing device, memory 904 (storing, among other things, reputation information, category information, cached entries, instructions to perform the methods disclosed herein, etc.) may be volatile (such as RAM), non-volatile (such as ROM, flash memory, etc.), or some combination of the two. This most basic configuration is illustrated in FIG. 9 by dashed line 906. Further, environment 900 may also include storage devices (removable, 908, and/or non-removable, 910) including, but not limited to, magnetic or optical disks or tape. Similarly, environment 900 may also have input device(s) 914 such as keyboard, mouse, pen, voice input, etc. and/or output device(s) 916 such as a display, speakers, printer, etc. Also included in the environment may be one or more communication connections, 912, such as LAN, WAN, point to point, etc.

Operating environment 900 typically includes at least some form of computer readable media. Computer readable media can be any available media that can be accessed by processing unit 902 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 900 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

This disclosure described some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

Although specific embodiments were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A method of accessing data comprising:
generating a request for data from a data source;
receiving requested data from the data source;
generating a variable time to live (TTL) modifier, wherein the variable TTL is generated by:
determining a first TTL modifier associated with reputation information for the data source,
determining a second TTL modifier associated with category information for the data source,
determining a third TTL modifier associated with a type of user associated with the requested data, and
wherein the generated variable TTL modifier is generated based on the first, second, and third TTL modifiers;
storing the received data in a cache, wherein the received data is associated with the variable TTL modifier; and
collecting telemetry data relating to an effectiveness of the cache;
analyzing the telemetry data to determine the effectiveness of the cache, wherein analyzing the telemetry data comprises comparing the telemetry data to known network data;
based upon the analysis, updating the first TTL modifier associated with the reputation information, updating the second TTL modifier associated with the category information, and updating the third TTL modifier associated with the type of user; and
sending the updated first, second, and third TTL modifiers to the data source.

2. The method of claim 1, wherein the telemetry data includes at least one of:
the number of cached entries stored in the cache, the number of data requests associated with the cache, and the number of data requests that required retrieving data from a remote device.

3. The method of claim 1, wherein the first TTL modifier is derived from reputation information including a reputation score.

4. The method of claim 1, wherein the category information comprises a category classification.

5. The method of claim 1, wherein at least one of the first, second, and third TTL modifiers comprises a negative value.

6. The method of claim 1, wherein the first TTL modifier is received from a reputation source.

7. The method of claim 6, wherein the reputation source is different from the data source.

8. The method of claim 7, wherein the first TTL modifier is different from the reputation information.

9. A non-transitory computer storage medium encoding computer executable instructions that, when executed by at least one processor, perform a method comprising:
generating a request for data from a data source;
receiving requested data from the data source;
generating a variable time to live (TTL) modifier, wherein the variable TTL is generated by:
determining a first TTL modifier associated with reputation information for the data source,
determining a second TTL modifier associated with category information for the data source,
determining a third TTL modifier associated with a type of user associated with the requested data, and
wherein the generated variable TTL modifier is generated based on the first, second, and third TTL modifiers;
storing the received data in a cache, wherein the received data is associated with the variable TTL modifier; and
collecting telemetry data relating to an effectiveness of the cache;
analyzing the telemetry data to determine the effectiveness of the cache, wherein analyzing the telemetry data comprises comparing the telemetry data to known network data;
based upon the analysis, updating the first TTL modifier associated with the reputation information, updating the second TTL modifier associated with the category information, and updating the third TTL modifier associated with the type of user; and
sending the updated first, second, and third TTL modifiers to the data source.

10. The non-transitory computer storage medium of claim 9, wherein the telemetry data includes at least one of: the number of cached entries stored in the cache, the number of data requests associated with the cache, and the number of data requests that required retrieving data from a remote device.

11. The non-transitory computer storage medium of claim 9, wherein the first TTL modifier is derived from reputation information including a reputation score.

12. The non-transitory computer storage medium of claim 9, wherein the category information comprises a category classification.

13. The non-transitory computer storage medium of claim 9, wherein at least one of the first, second, and third TTL modifiers comprises a negative value.

14. The non-transitory computer storage medium of claim 9, wherein the first TTL modifier is received from a reputation source that is different from the data source and the first TTL modifier is different from and based on the reputation information.

15. The non-transitory computer storage medium of claim 9, wherein generating the variable TTL comprises providing the first, second, and third TTL modifiers to a function.

16. The non-transitory computer storage medium of claim 9, wherein a unit of the variable TTL relates to one of:
   a second;
   a minute;
   an hour; and
   a day.

17. A method for updating variable time to live (TTL) modifiers, the method comprising:
   receiving telemetry data from at least one client device, wherein the telemetry data is related to an effectiveness of a cache on the client device;
   analyzing the telemetry data to determine the effectiveness of the cache, wherein analyzing the telemetry data comprises comparing the telemetry data to known network data;
   based upon the analysis, updating a first TTL modifier associated with a reputation score, updating a second TTL modifier associated with a category classification, and updating a third TTL modifier associated with a user classification; and
   sending the updated first, second, and third TTL modifiers to the at least one client device.

18. The method of claim 17, wherein the first TTL modifier is derived from reputation information including the reputation score.

19. The method of claim 17, wherein at least one of the first, second, and third TTL modifiers comprises a negative value.

20. The method of claim 17, wherein the telemetry data comprises at least one of:
   a number of cached entries stored in the cache;
   a number of requests that were supplied by the cache; and
   a number of data requests that required retrieving data.

* * * * *